United States Patent
Song et al.

(10) Patent No.: US 6,266,680 B1
(45) Date of Patent: Jul. 24, 2001

(54) METHOD FOR ELECTRONICALLY CHECKING AUTHENTICITY OF DOCUMENT

(75) Inventors: Byoung Youl Song, Jeollabuk-Do; Hyeon Sung Cho, Daejeon; Kyeong Ho Lee, Dajeon; Hyun Kyu Cho; Ho Sang Ham, both of Daejeon, all of (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 09/002,381

(22) Filed: Jan. 2, 1998

(30) Foreign Application Priority Data

Sep. 11, 1997 (KR) .................................................. 97-46858

(51) Int. Cl.$^7$ ...................................................... G06F 17/22
(52) U.S. Cl. ............................................ 707/500; 707/530
(58) Field of Search .................................. 707/500, 530, 707/512, 511; 380/23, 25, 28, 30

(56) References Cited

U.S. PATENT DOCUMENTS

| | | | |
|---|---|---|---|
| 5,022,080 | * 6/1991 | Durst et al. | 380/23 |
| 5,136,643 | * 8/1992 | Fischer | 380/23 |
| 5,189,700 | * 2/1993 | Blandford | 380/23 |
| 5,680,455 | * 10/1997 | Linsker et al. | 380/18 |
| 5,748,738 | * 5/1998 | Bisbee et al. | 380/25 |
| 5,872,848 | * 2/1999 | Romney et al. | 380/25 |
| 5,905,800 | * 5/1999 | Moskowitz et al. | 380/28 |
| 5,912,974 | * 6/1999 | Holloway et al. | 380/51 |
| 6,002,768 | * 12/1999 | Albanese et al. | 380/25 |
| 6,035,402 | * 2/2000 | Vaeth et al. | 713/201 |
| 6,082,774 | * 6/2000 | Schlauch | 283/67 |

* cited by examiner

Primary Examiner—Stephen S. Hong
(74) Attorney, Agent, or Firm—Antonelli, Terry, Stout & Kraus LLP

(57) ABSTRACT

A method for electronically checking documents as to their authenticity is disclosed, in which an official seal is not put on the document, but the document itself shows to be notarized, and the authenticity of a document can be electronically confirmed. The method for electronically checking the authenticities of documents includes the step of forming a document with an electronically authenticity-checking format for showing that a document has been notarized without using an official seal (first step). It further includes the step of judging as to whether the document with the electronically authenticity-checking format has been really notarized (second step). Therefore, a notarization feature can be provided even to facsimile documents and to printed-out documents. Therefore, a document having a notarization feature can be transmitted even to a remote place, thereby preventing forgery of documents.

5 Claims, 5 Drawing Sheets

METHOD FOR ELECTRONICALLY CHECKING AUTHENTICITY OF DOCUMENT

BACKGROUND OF THE INVENTION

1. Field of the Invention

The present invention relates to a method for electronically checking documents as to their authenticity. Particularly the present invention relates to a method for electronically checking documents as to their authenticity, in which an official seal is not put on the document, but the document itself shows to be notarized, and the authenticity of a document can be electronically confirmed.

2. Description of the Prior Art

Notarization refers to the fact that the content of the document is same as the content of the original document, and the document is issued by the organization which has issued the original document. Conventionally, notarization is executed in such a manner that a document transmitted from a remote place, or a document printed by a printer is attached with a paper of special format on which an official seal is stamped by the notarizing organization, thereby proving the notarization.

However, in accordance with the progress of the copying technique, the above described conventional notarizing method has become unreliable because the notarization itself can be copied. Thus there can be involved fraudulence and forgery. Further, in the conventional notarizing method, there is a disadvantage that the notarizing organization has to be visited however remotely it may be located.

SUMMARY OF THE INVENTION

The present invention is intended to overcome the above described disadvantages of the conventional technique.

Therefore it is an object of the present invention to provide a method for electronically checking documents as to their authenticity, in which an official seal is not put on the document, but the document itself shows to be notarized, and the authenticity of the document can be electronically confirmed.

In achieving the above object, the method for electronically checking authenticity of documents according to the present invention includes the steps of: forming a document with an electronically authenticity-checking format to indicate that a document has been notarized without using an official seal (first step); and determining whether the document with the electronically authenticity-checking format has been notarized (second step) to The first step includes the steps of: forming a bit map image for the document to be electronically notarized, and using a rectangular mask to inspect the information of the bit map in a certain direction, so as to form a total image information consisting of a series of bit streams of; applying a hash function to the total image information consisting of bit streams to form a hash value as a unique value for the total image information; storing a serial number of the document and the hash value into a data base (13th step); judging as to whether a notarization should be conformed by on-line or off-line; encrypting the hash value by using a customary encrypting method in a case where on-line confirmation has been adopted as a result of the, and using an opening key encrypting method in a case where the off-line method has been selected; and forming a document with an electronically authenticity-checking format including the serial number of the document, the hash value and the encrypted hash value, and outputting the document The second step includes the steps of: receiving a document to be confirmed from among documents with electrically authenticity-checking format of the first step; locating an inspection start point at a left position of the document, and receiving a document-related information from a top right position of the document; inspecting an actual document by using a mask having the same size as that of the document based on the document-related information, and converting the image information into bit streams; forming a hash value for the bit streams by using a hash function; obtaining an encrypted hash value at a line next to an inspection end point; determining whether the document is to be inspected by on-line or not, so as to use an encrypting key same as that of the customary encrypting method in a case where an on-line inspection is executed, and so as to decode the encrypted hash value by using the opening key in a case where an off-line inspection is executed; and comparing the hash value for the bit streams with the encrypted hash value decoded, and notifying to a user an authenticity of the document if the two values correspond with each other.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENT

The present invention will be described in detail referring to the attached drawings.

Figure 1:
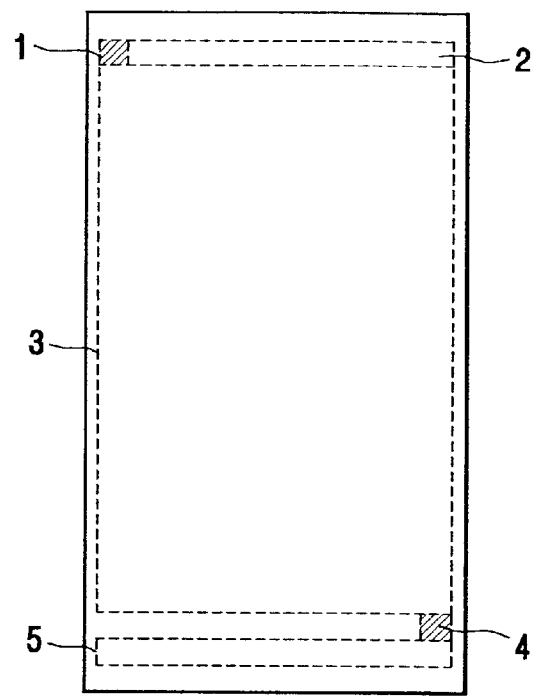
FIG. 1 illustrates a document with an electronically authenticity-checking format according to the present invention.
Figure 2:
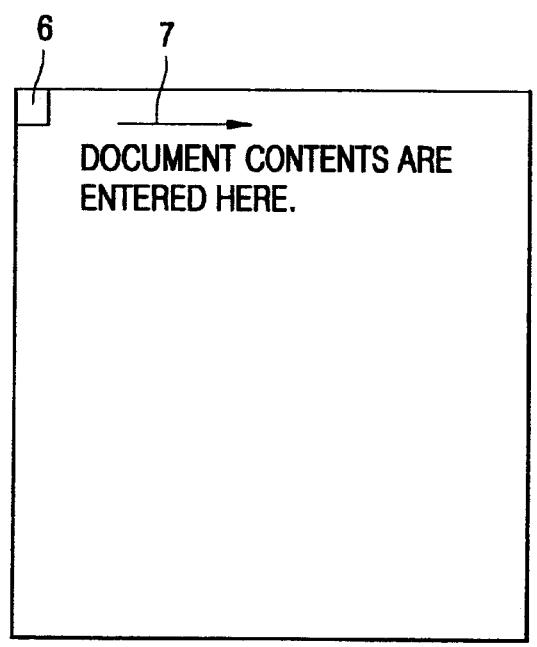
FIG. 2 illustrates an example of a method for obtaining bit streams from an image of the document of FIG. 1.
Figure 3:
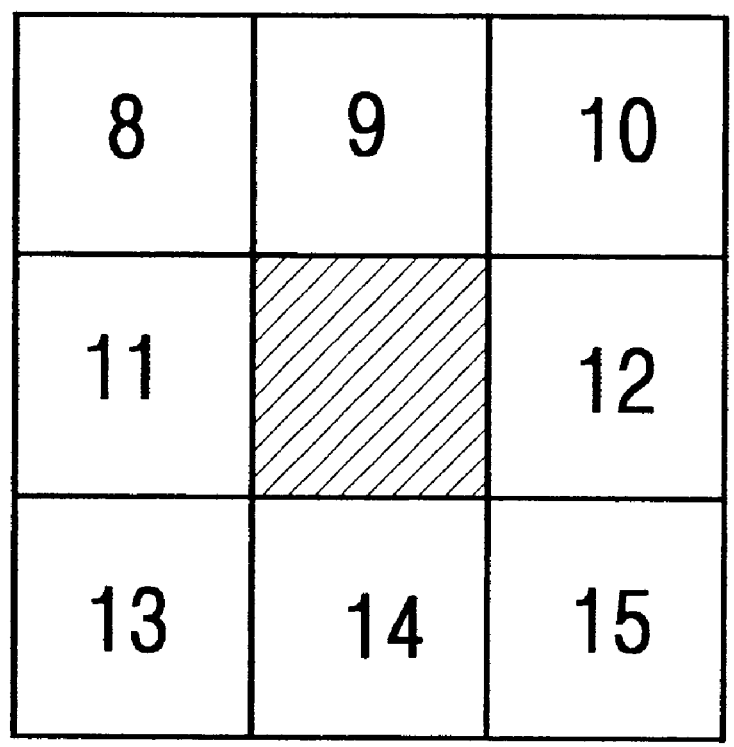
FIG. 3 illustrates the constitution of the map code used for expressing the image-inspected value according to the present invention.
Figure 4:
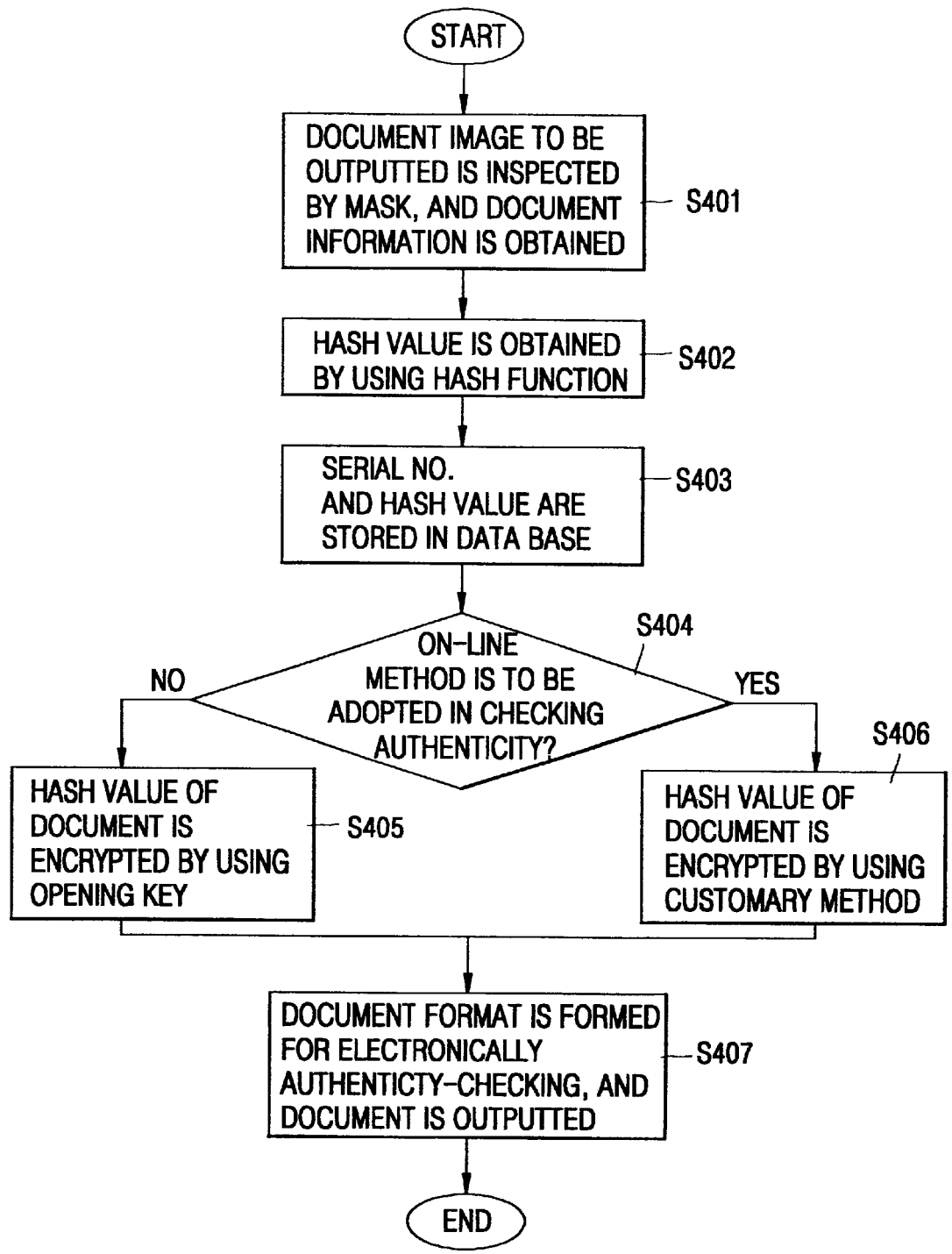
FIG. 4 is a flow chart of a process of forming an electronically authenticity-checked document according to the present invention.

FIG. 1 illustrates a document with an electronically authenticity-checking format according to the present invention. FIG. 2 illustrates an example method for obtaining bit streams from an image of the document of FIG. 1. FIG. 3 illustrates the constitution of the map code used for expressing the image-inspected value according to the present invention. FIG. 4 is a flow chart of a method for forming an electronically authenticity-checked document according to the present invention.

If a document is to be notarized according to the present invention, there has to be prepared a document with a special format for providing a notarized feature to the document, that is, a document with an electronically authenticity-checking format as shown in FIG. 1. Referring to FIG. 1, the electronically authenticity-checking format for providing a notarized feature to the document has the following characteristics. That is, at the left top of the document, there is provided a document content inspection start point 1, which indicates the beginning of the important contents of the document. At the right of the document content inspection start point 1, there is provided a document-related information 2 which includes a size of mask, the total number of the mask lines to be inspected, and a document serial number. Starting at the next line, an actual document content 3 is provided. Then at the lines next to the last line of the actual document content 3, there is provided a content inspection end point 4 which indicates the end of the actual document, and a start of the notarized information. At lines next to the content inspection end point 4, there is provided the notarization information 5.

The document content inspection end point 4 shows that there is no further contents to be inspected. The document notarization information 5 certifies that the current document is same as the original document.

Such a document format is commonly used regardless of the type of the auxiliary documents such as receipt or product procurement document.

Meanwhile, the document-related information 2 and the document notarization information 5 are expressed by a map code in the form of 3×3 to show 256 8-bit characters. This is for complementing the fact that the existing bar codes can express only 128 characters.

FIG. 3 illustrate the constitution of the map code used for expressing the image-inspected value according to the present invention. Referring to FIG. 3, the map code is capable of confirming as to whether the map codes crossing the center of a matrix are aligned correctly. In order to discriminate misprinted points from the normal map codes, the map code is always filled. The remaining 8 points are expressed in characters. The sequence is such that the left top (8) is the uppermost bit, and the right bottom (15) is the lowermost bit. That is, one byte is formed in the sequence of (8), (9), (10), (11), (12), (13), (14) and (15).

Meanwhile, when inspecting the format of the document having the above constitution, first the document to be notarized is converted into a bit map image. Then as shown in FIG. 2, by using a rectangular mask 6 having a certain size, the bit map information is inspected in the direction of an arrow mark 7. In accordance with the relevant positions, the information is expressed in the binary form of 1 or 0, and in this manner, a total image information consisting of a series of bit streams is obtained.

The image information thus obtained is converted into smaller sizes of information based on a hash function, and these values are encrypted by an encrypting key which is possessed by an authenticity-checking organization. The fact that the hash information has been encrypted by the encrypting key of the authenticity-checking organization plays the role of an official seal evidencing to the fact that the document has been issued by the relevant organization, because the encrypting key is held only by the authenticity-checking organization. After obtaining the information on the document issuance, the authenticity-checking organization stores the document-related information such as the serial number and the like, and the hash value before the encrypting, so as to prepare for a later reference.

FIG. 4 illustrates a series of the steps described above.

FIG. 4 is a flow chart of a method for forming an electronically authenticity-checked document according to the present invention. Referring to FIG. 4, the process of preparing a document with an electronically authenticity-checking format as shown in FIG. 1 is executed in the following manner. First, a document to be notarized is converted into a bit map image. Then a rectangular mask 6 of a predetermined size is used to inspect the bit map information in a certain direction, thereby obtaining a total image information consisting of a series of bit streams at step 401. (S401).

Then a hash function is applied to the total image information to obtain a mathematical checking value as a unique value for the document information, i.e., hash value at step 402 (S402).

After the serial number and hash value are obtained from the document to be notarized and are stored, in database a determination is made as to whether an inspection for the notarization is be carried out by on-line or off-line at step 404 (S404). In the case where an on-line is adopted, a customary encrypting method is employed to encrypt the mathematical checking value, i.e., the hash value (S606). In the case where an off-line is adopted, an opening key encrypting method is used to encrypt the mathematical checking value, i.e., the hash value of the document (S405). Then a document format for electronic authenticity-checking is formed including the serial number of the document, the hash value and the encrypted hash value. Then this document is outputted at step 407 (S407).

Under this condition, the customary encrypting method has been used in banks and the like for encrypting the secret numbers of the customers. In this method, a single encrypting key maybe used in the decoding of secret numbers. In the opening key encrypting method, a key for encrypting is different from that for the decoding. Therefore there is the limitation that both the encrypter and decoder have to have the same key. In this method, the encrypting for a received encrypted information is possible only by the person who has the same encrypting key. In this point, it has the function of electronic signature.

Further, when a series of information is passed through a particular function, there can be obtained a unique value for the information of a certain size (16 bytes or 20 bytes). This unique value becomes greatly different even if there is a small difference in the original information. Therefore it can be used in detecting a variation in the contents of a document.

Figure 5A:
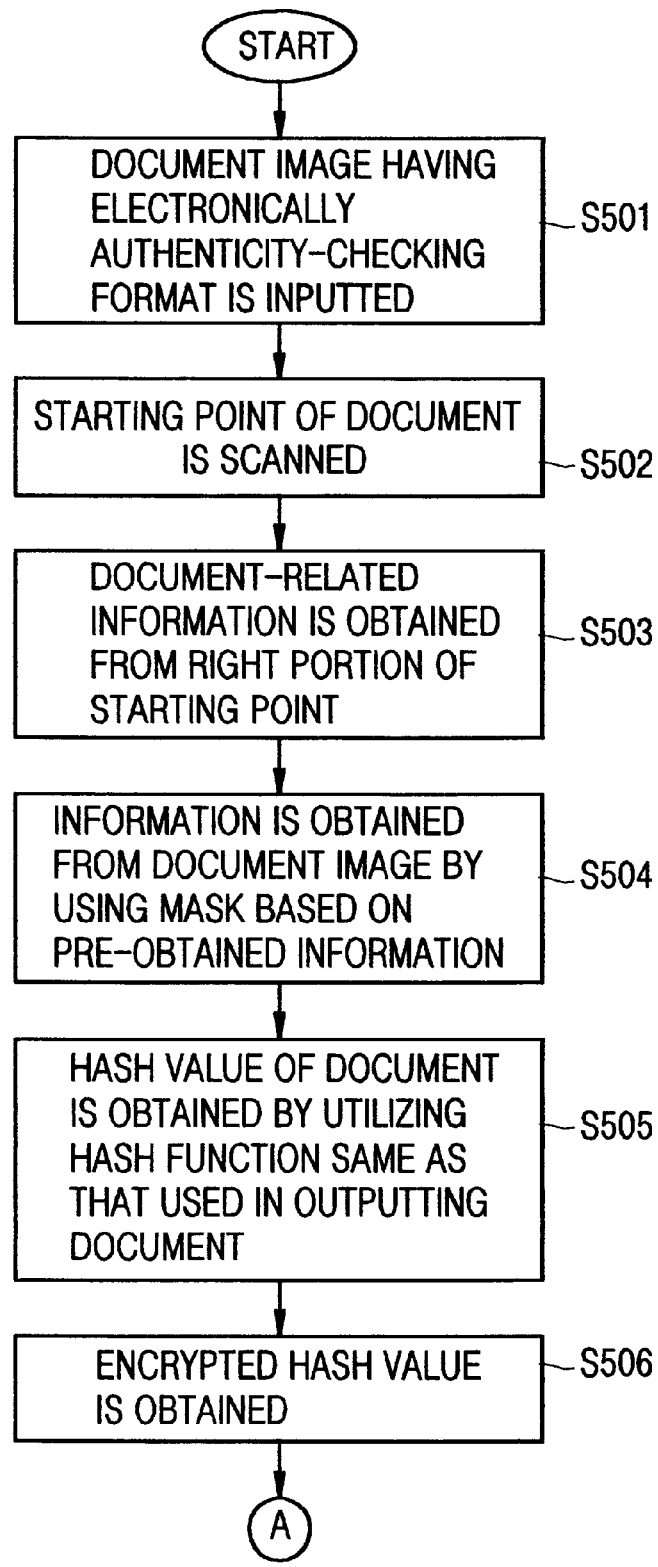
FIGS. 5A and 5B are flow charts of a process of confirming the authenticity-checking of the document with the electronically authenticity-checking format according to the present invention.
Figure 5B:
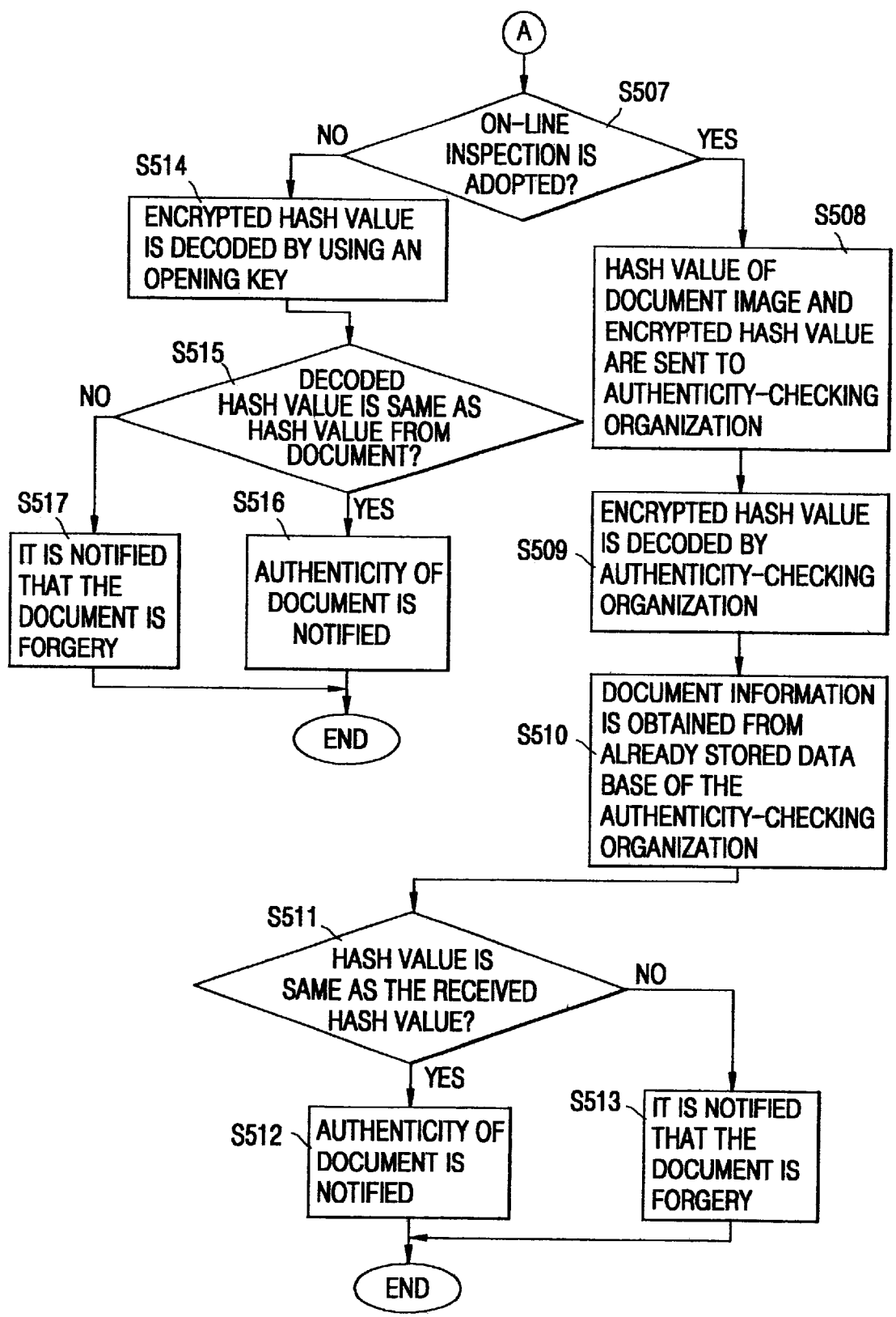

A method for electronically authenticity-checking documents through the above described steps is illustrated in FIGS. 5A and 5B.

FIGS. 5A and 5B are flow charts illustrating a process of confirming the authenticity-checking of the document with the electronically authenticity-checking format shown in FIG. 1 according to the present invention.

Referring to FIG. 5A, first a document image with an electronically authenticity-checking format shown in FIG. 1 is received through an image inputting device such as a scanner or the like at step 501 (S501). Then in order to start an inspection, the content inspection starting point 1 which is located at the top left position of the document is detected at step 502 (S502). Then the region of map code which is positioned next to the content inspection starting point 1 is detected to find out the document-related information 2 at step 503 (S503). Under this condition, the document-related information 2 includes a document serial number and the like which are to be used for applying the mask (for inspecting the content image) and for a later reference.

When the document-related information 2 has been obtained in the above described manner, the actual document content 3 is inspected by using the mask as when inspecting the electronic document. Thus a series of bit streams are obtained for forming a hash value of the document at step 504 (S504). Then by using a function same as that for the document outputting, a hash value $H_1$ which is the unique value of the already obtained at step 505 document information is obtained (S505). Then at a line next to the document content inspection end point 4, an encrypted document hash value $H_2$ expressed in map codes is obtained at step 506 (S506).

Then by utilizing the two sets of information thus obtained, i.e., the newly formed hash value $H_1$ and the encrypted hash value $H_2$ (which is formed during the preparation of the document), there is used one of two method, i.e., an on-line method and an off-line method. For this, the possibility of the use of the on-line method is checked at step 507 shown in FIG. 5B (S507).

In the case where the on-line method is adopted, the customary encrypting method is used in which a single encrypting key is used. In this case, the encrypted document hash value $H_2$ and the new hash value $H_1$ obtained from the document image are sent together with the serial number of the document through a computer network to the organization which holds the authenticity information at the time of the issuance of the document at step 508 (S508). The authenticity-checking organization decodes the encrypted hash value $H_2$ by means of its own encrypting key at step 509 (S509). Further, the authenticity-checking organization recovers the document information from the already stored data base by referring to the document serial number at step 510 (S510).

Then the information from the data base, the hash value $H_1$ and the decoded hash value $H_2$ are compared with each other at step 511 (S511). If these two results are the same, it is notified to the user that the document is authentic at step 512 (S512). If they are not the same, it is notified to the user that the document is not authentic but fraudulent at step 513 (S513).

Meanwhile, in the case where the off-line is adopted an the opening key encrypting method in which the hash information is encrypted by using two encrypting keys. In this case, the encrypted hash value $H_2$ is decoded by means of the opening key of the document sending organization at step 514 (S514). Then it is compared with the hash value $H_1$ of the actual document, and if the two results are the same, then the authenticity is notified to the user at step 516 (S516). If they are not the same, then the document is a forgery, and therefore, this fact is notified to the user at step 517 (S517).

According to the present invention as described above, the method for electronically checking documents as to their authenticity according to the present invention has the following advantages. That is, an official seal is not stamped on the document, but the document itself shows to be notarized, and the authenticity of a document can be electronically confirmed. Therefore, a notarization feature can be provided even to facsimile documents and to printed-out documents. Therefore, a document having a notarization feature can be transmitted even to a remote place, thereby preventing forgery of documents.

What is claimed is:

1. A process of forming a document printed on a printable medium having an electronically-authenticity checking format utilized for electronic authentication, comprising the steps of:

(a) obtaining a bit map image of said document to be electronically notarized, and using a mask to inspect the bit map image in a predetermined direction so as to form image information of said document consisting of a series of binary bit streams;

(b) obtaining a hash value by applying a hash function to the image information;

(c) storing a serial number of said document and the hash value into a database;

(d) determining whether an on-line method or an off-line method is to be adopted for authenticating the notarization of said document;

(e) encrypting the hash value using either a customary encrypting method when said on-line method is adopted for authenticating the notarization of said document, or an opening key encrypting method when said off-line method is adopted for authenticating the notarization of said document; and (f) forming said document with said electronically authenticity-checking format containing the serial number of said document, the hash value and the encrypted hash value.

2. The process as claimed in claim 1, wherein said step (f) comprises steps of:

(f-1) marking a document content inspection starting point at a top left portion of said document;

(f-2) entering document-related information including a size of a mask, a total number of mask inspection lines and a document serial number at the right of said document content inspection starting point;

(f-3) entering contents of said document starting at next lines thereafter;

(f-4) marking a content inspection end point at a next line after the contents of said document which indicates an end of the contents of said document and a start of an inspection of its authenticity; and (f-5) entering as document authenticity information an encrypted hash value at a location next to the document inspection end point.

3. The process as claimed in claim 2, wherein said document-related information and said document authenticity information consist of a map code in the form of a 3×3 matrix for expressing information of 256 8-bit characters.

4. The process as claimed in claim 1, further comprising steps of:

(g) receiving image information of said document to be confirmed, via said electrically authenticity-checking format;

(h) locating an inspection start point at a top left portion of said document, and receiving document-related information from a top right portion of said document;

(i) inspecting said document by using a mask having a predetermined size based on the document-related information, and converting the image information into bit streams;

(j) forming a hash value for the bit streams by using a hash function;

(k) obtaining an encrypted hash value at a line next to the document content inspection end point;

(l) determining whether said document is to be inspected by on-line so as to use an encrypting key same as that of the customary encrypting method when an on-line inspection is executed, and so as to decode the encrypted hash value by using the opening key when an off-line inspection is executed; and (m) comparing the hash value with the decoded hash value, and notifying a user if the two values are the same.

5. The system as claimed in claim 4, wherein said document-related information consists of a map code in the form of a 3×3 matrix for expressing information of 256 8-bit characters.

* * * * *